July 5, 1932. G. NAESER 1,865,878
METHOD AND MEANS FOR MEASURING THE TEMPERATURES OF INCANDESCENT BODIES
Filed Aug. 17, 1929
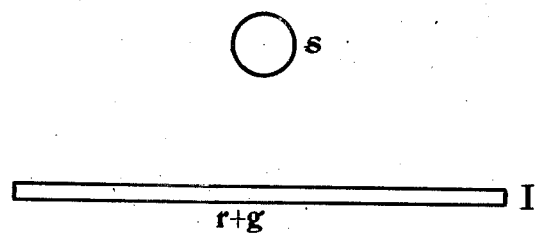
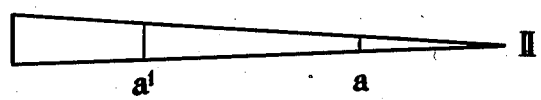
Fig.1.
Fig.2.
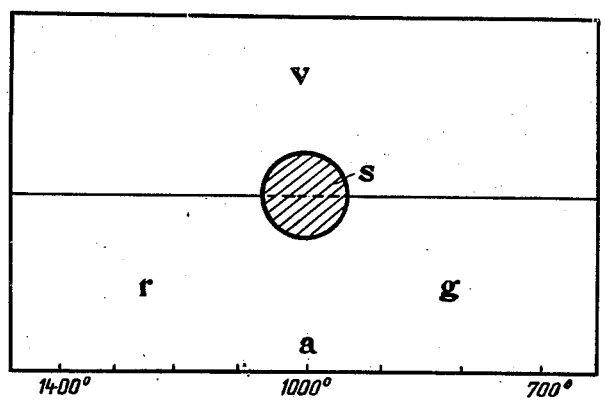
Inventor
Dr. G. Naeser:
by
W. E. Evans.
Attorney.

Patented July 5, 1932

1,865,878

UNITED STATES PATENT OFFICE

GERHARD NAESER, OF DUSSELDORF, GERMANY, ASSIGNOR TO KAISER-WILHELM INSTITUTE FÜR EISENFORSCHUNG, REGISTERED ASSOCIATION, OF DUSSELDORF, GERMANY

METHOD AND MEANS FOR MEASURING THE TEMPERATURES OF INCANDESCENT BODIES

Application filed August 17, 1929, Serial No. 386,700, and in Germany October 31, 1928.

The methods of optical pyrometry are based upon the measurement of energy which is emitted by the radiant bodies and varies with the temperature of such radiant bodies under known laws. According to these laws radiation varies with the temperature in two directions. Firstly there is an increase in radiation as the temperature rises and secondly there is an alteration due to change in intensity conditions among the separate monochromatic radiant parts. The first mentioned alteration in radiation is measured with total radiation and brilliancy pyrometers. These instruments, however, give a temperature which lies to a greater or lesser degree below the actual temperature depending upon the nature of the surface of the radiant bodies, which is in most cases unknown. On the other hand the so-called colour temperature which is based on the measurement of the intensity conditions of the separate colours has the special advantage that it approaches the actual temperature much more closely. It has furthermore the great advantage for most of the practical radiant bodies, which as grey radiant bodies possess the same distribution of energy as the black body, of directly indicating the actual temperature in contradistinction to the temperatures measured by other methods. If the emission differs considerably from that of the black body, the colour temperature indicates an upper limit. These fundamental advantages have given rise to the construction of a series of colour pyrometers. They are based either on a direct comparison of the colour of a standard lamp with that of the radiant body, or if the standard lamp be not used, on matching with a mixed colour of two different colours. The separation of the colours, whose intensity conditions serve for the measurement of the temperature, is effected either by prismatic analysis or by the use of a number of colour filters side by side. The several colours are then mixed again by an optical apparatus. These instruments are therefore provided with fine optical and mechanical devices and possess the disadvantages of all such instruments, that is to say they are difficult to manipulate, are costly and are very delicate.

The present invention is based on the use of light filters and colour wedges, which are transparent to a number of colours simultaneously. By using filters with a number of transparencies both for separation and for mixing and toning down, any complicated optical or mechanical device for the production or combination of colours is rendered superfluous. The production of a surprisingly simple temperature measuring device in the form of a coloured disc is rendered possible.

The filter is composed of two filters placed one behind the other. The first filter is of plane form, and completely screens certain parts of the spectrum of the radiant body. Behind this filter is placed a second filter which is not of plane form, and which transmits part of the colours allowed to pass by the first filter but absorbs the remainder to an extent which increases gradually or in stages. In consequence of the variations or changes in the degree of absorption of different colours there is produced a mixture of light rays which has at all points a different spectral distribution and therefore a different colour. The colours which pass through the first filter thus merge at a particular point of the second filter to form a mixed or neutral colour. The part of the filter at which this mixed or neutral colour is formed is dependent, in a filter of given transparency, on the spectral distribution of the rays emitted by the radiant body, and therefore on the temperature thereof. The point at which the mixed colour appears is employed as an index of the temperature of the radiating body.

So far as the selection of the colours is concerned, it is advantageous, for example, to use only two colours and if possible monochromatic colours which lie far apart in the spectrum, to which the eye is particularly sensitive and which yield a mixed colour contrasting with the components, e. g. complementary colours.

Figure 1 shows the measuring device consisting of the elements I and II in plan, the radiant body being at S and the observer at b.

Figure 2 is a front view of the measuring device.

The composition and mode of action of the filter will be described with reference to the accompanying drawing taking the two arbitrarily selected colours red and green as an example.

In Figure 1 the first filter (I) the plane filter, absorbs all the colours except red and green of the radiation emitted by the radiant body S. The second filter (II), which is wedge-shaped absorbs the green in proportion as the thickness of the wedge increases, but allows the red to pass through without absorption. Consequently at the point $a$ for example, the two colours will be transmitted in such proportion that a whitish mixed colour is seen by the eye at $b$. If the temperature of the radiant body be now increased, the ratio of the colours green to red becomes greater. At the point $a$ the filter will appear green owing to the increased green radiation, but on the other hand the neutral mixed colour will appear now at the point $a'$ which previously appeared red. The point at which the mixed or neutral colour appears therefore moves as the temperature rises in the direction $a$—$a'$. In order that the mixed colour may be recognized more easily, there may be placed beside this filter a second filter which always shows the mixed colour independently of the temperature. Figure 2 shows the measuring device seen from the position of the observer. $rg$ is the measuring device composed of the plane filter and the wedge filter, $v$ the standard filter lying beside it. The radiant body the luminous image of which is indicated by the surface S, is supposed to exhibit the mixed colour at the point $a$ and therefore a temperature of 1000°. If a radiant body of a temperature of 1000° be observed through the measuring device, it appears in the standard filter $v$ of a light yellow colour which becomes brighter and brighter as it passes from left to right, while through the measuring device $rg$ at the left it appears red, at the position where it is indicated as at a temperature of 1000° it appears yellow, and at the right it appears green. At the point $a$ representing 1000° the body appears in the two filters to be of the same light yellow colour.

Although it suffices for most purposes to use a single plate-shaped filter, an optical arrangement for condensing or screening off the light may be suitable for many purposes. An arrangement of the filter in the form of a circular ring makes the measuring device particularly small and easy to manipulate.

The advantages of the measuring filter in comparison with other optical temperature measuring instruments lie in its simplicity, its cheapness and lack of delicacy. Accuracy is increased by the use of three or four colours.

I claim:—

1. Means for measuring the temperatures of radiant bodies by determination of the relationship between two colour rays of appreciably differing wave lengths emitted by the body, comprising a plane filter transparent to the rays of certain colours including the said two colour rays and upon which the rays emitted by the radiant body are directed, and a second filter whose thickness varies from point to point and which is set across the path of the rays transmitted by the plane filter, the second filter passing one of the two colour rays unabsorbed but absorbing the other of the said colour rays to a differing degree at different points of the surface whereby the two colour rays are rendered as a mixed neutral colour at a point upon the second filter which varies according to the temperature of the radiant body.

2. Means for measuring the temperatures of radiant bodies, according to claim 1, comprising in addition to the plane filter and the filter of varying thickness a standard filter set in juxta-position to the filter of varying thickness also to receive rays passed by the plane filter and of a density and form to pass said rays uniformly so that the two colour rays are rendered throughout its surface as the mixed neutral colour for comparison with the mixed neutral colour exhibited by the filter of varying thickness.

3. A method of measuring the temperatures of radiant bodies by determination of the relationship of two colour rays of appreciably differing wave length emitted by the body consisting in separating said colour rays and passing them through a filter which is transparent to the two colour rays and by its varying density absorbs one of the said colour rays to an increasing degree and in determining that density of the said filter which is necessary to transmit the two colour rays in a definite mixture of colours based upon the said rays.

GERHARD NAESER.